United States Patent Office 3,113,964
Patented Dec. 10, 1963

3,113,964
PREPARATION OF PHTHALIC ACIDS AND
DERIVATIVES THEREOF
Adalbert Farkas, Media, and Geza Szonyi, Broomall, Pa.,
assignors to Allied Chemical Corporation, New York,
N.Y., a corporation of New York
No Drawing. Filed June 1, 1960, Ser. No. 33,086
5 Claims. (Cl. 260—515)

This invention relates to methods for preparing phthalic acids and certain of their derivatives. It is particularly directed to non-catalytic processes for preparing terephthalic acid, isophthalic acid and their amide derivatives.

Various processes have heretofore been proposed to produce phthalic acids and their derivatives, especially their amide derivatives. The previous processes, however, have been characterized by use of undesirable features of reaction, including, e.g., operation under conditions requiring either high consumption of caustic or the presence of catalysts, including acids, to produce a crude product which does not meet the highest specifications of purity and color. Low yields resulting from, e.g., increased formation of by-products have also characterized certain of the heretofore employed processes for production of these acids and their derivatives.

An object of the present invention is to provide non-catalytic processes for preparing phthalic acids and their amide derivatives.

It is a further object of the invention to provide efficient and economical processes for producing terephthalic and isophthalic acids by non-catalytic hydrolysis of the corresponding nitriles.

Other objects and advantages will be apparent to those skilled in the art from the following description and examples.

Meta- and para-disubstituted benzenes form a series of compounds which are progressively more hydrolyzed as follows: the dinitriles, the cyanoamides, the diamides, the amido-acids and the diacids. In this series, the earlier-listed compounds are more hydrolyzable than the later-listed compounds, the diacid not being hydrolyzable at all. The later-listed compounds are more hydrolyzed than the earlier-listed compounds, the dinitrile being unhydrolyzed.

For example, the hydrolysis of terephthalonitrile proceeds in accordance with the general scheme shown below:

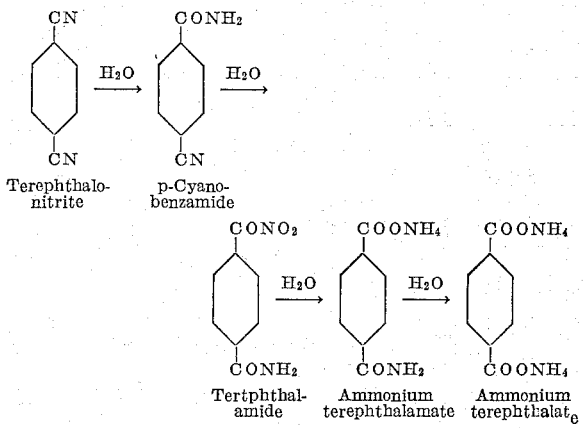

Similarly, the hydrolysis of isophthalonitrile proceeds as shown below:

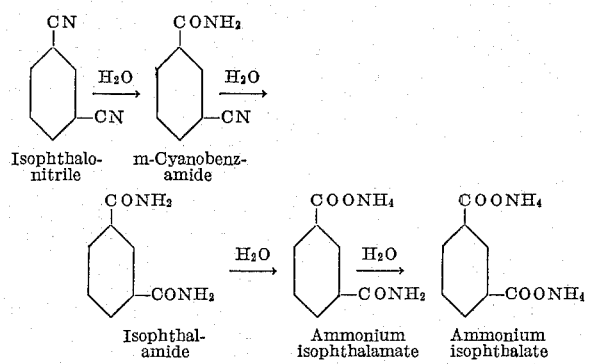

According to the present invention, a charge material of the group consisting of terephthalonitrile, isophthalonitrile, terephthalamide, isophthalamide and mixtures thereof is hydrolyzed by a process which comprises maintaining said charge material in contact with water and in the absence of a catalyst at temperature of about 140° C. to 280° C. and under pressure for at least about three hours.

The hydrolysis reaction produces one or more of the hydrolyzed products shown in the systems reproduced above. The ammonium salt products may be converted into the corresponding acids by acidification in accordance with conventional procedures.

The reactions of this invention are conducted in the presence of water. The amount of water employed is at least equal to the stoichiometric amount required to effect the desired reaction, i.e., one mol of water for each nitrile group converted to an amido group; one mol of water for each amido group converted to a carboxyl group; or two mols of water for each nitrile group converted directly to a carboxyl group. Preferably, a substantial excess of water is present. Thus, outstanding results have been obtained using water in amount ranging from about 4 to 200, preferably about 25 to 75, times that stoichiometrically required.

Reaction temperature of at least about 140° C. but not above 280° C. is employed. Ordinarily, if temperature in excess of 280° C. is employed for an extended period of time, decarboxylation can occur with formation of undesirable by-products. At temperature below about 140° C., the conversion velocity is too slow. For each of the reaction systems, i.e., consisting of water and starting material, the most effective temperatures in terms of reaction velocity and yield of desired product lie within a range within the limits indicated, which range varies with the nature of the charge constituent, the reaction mixture and the extent to which the hydrolysis is to be effected.

The effective pressure employed varies in accordance with the reaction temperature, and generally is the autogenous pressure of the system. For example, at minimum reaction temperature of about 140° C., the corresponding pressure employed is about 38 p.s.i.g. At maximum temperature of 280° C., the corresponding pressure used is 916 p.s.i.g.

By carrying out the non-catalytic hydrolysis reactions of the present invention at temperature of 200° to 280° C., preferably 240° to 260° C., under pressure of 211 to 916 p.s.i.g., preferably 470 to 665 p.s.i.g., for at least about three hours, preferably at least about ten hours, the hydrolysis of charge material of the group consisting of terephthalonitrile, isophthalonitrile, terephthalamide, isophthalamide and mixtures thereof will yield the ammonium salts of the corresponding phthalic acids as the main products. These products will usually contain up to about 30% of the partially hydrolyzed ammonium salts of the corresponding phthalamic acids.

By carrying out the non-catalytic hydrolysis reactions of the present invention at temperature ranging from about 140° to below 200° C., preferably 150° to 180° C., under pressure ranging from about 38 to below 211 p.s.i.g., preferably 55 to 131 p.s.i.g., for at least about three hours, preferably at least about five hours, the hydrolysis of the aforementioned charge materials will yield one or more of the corresponding cyanobenzamides, the amides of the corresponding phthalic acids and the ammonium salts of the corresponding phthalamic acids as the main products.

When the non-catalytic reactions of this invention are carried out as herein-indicated, good yields of highly desirable products are typically obtained, there being little or no formation of undesirable by-products. These products can be separated from each other and/or from the charge materials by relatively simple methods such as leaching or recrystallization.

The products of this invention find utility as intermediates for the manufacture of polyester resins fibers and films.

In typical practice of the present invention, the charge nitrile or amide, together with the requisite amount of water, may be placed in a closed reaction vessel such as an autoclave. Upon heating the vessel to the desired temperature and maintaining the reaction mixture under pressure while shaking for the requisite time, the charge material is non-catalytically converted to desired product. Yields of product may be as high as 93% based on the material reacted. Because of the particular conditions of reaction, substantially no undesirable byproducts are formed during the reaction and the reaction mixture may readily be worked up. For example, most of the reaction products can be readily separated from each other and from unchanged charge material on the basis of their solubilities.

The acidic products, terephthalamic and isophthalamic acids, terephthalic and isophthalic acids, stay dissolved in the aqueous phase in the form of their ammonium salts. On the other hand, the non-acidic materials, terephthalamide and isophthalamide, para- and meta-cyanobenzamide, terephthalonitrile and isophthalonitrile, are practically insoluble in water.

The acidic products present in the form of the ammonium salts in the aqueous phase are separated from the solid products and unreacted dinitriles by filtration. The filtrate is decolorized by charcoal or some other suitable absorbent and then acidified to liberate the free acids which are recovered by filtration, washing and drying. Amido-acids present in the diacids can be removed by recrystallization, e.g. from pyridine, leaching, or repeated treatment with water under the specified conditions.

Of the group comprising terephthalonitrile and its hydrolysis products, para-cyanobenzamide and terephthalamide, only terephthalonitrile is soluble in xylene. Both para-cyanobenzamide and terephthalonitrile are soluble in acetone. Hence, the three non-acidic materials can be separated by either of the following two methods:

(1) The materials are first leached with xylene to dissolve unreacted terephthalonitrile, then with acetone to remove para-cyanobenzamide. The residue is terephthalamide, and the other two products are recovered by distilling off the solvent from the xylene solution and from the acetone solution.

(2) The materials are treated with acetone to dissolve para-cyanobenzamide and unreacted terephthalonitrile. Terephthalamide is recovered as the residue. The solvent is then distilled off from the acetone solution, and the solids dissolved therein are then leached with xylene to remove terephthalonitrile, whereupon para-cyanobenzamide is obtained as the residue. Terephthalonitrile is recovered by distilling off the solvent from the xylene solution.

Similar solubility conditions prevail in the case of the hydrolysis products of isophthalonitrile, and, hence, similar leaching and dissolution procedures can be applied to separation of the hydrolysis products of isophthalonitrile.

Furthermore, the described separation procedures or analogous procedures can also be applied to the separation of hydrolysis products obtained from terephthalamide or isophthalamide.

The following examples will further illustrate how the present invention may be carried out in practice. In the examples, parts are by weight.

*Example 1*

15.36 parts of terephthalonitrile and 100.22 parts of water were heated for 7 hours at 150° C. in a stainless steel shaking autoclave, the pressure being 55 p.s.i.g. After cooling the reaction mixture to room temperature, 14.7 parts of solids were filtered off. This material was combined with an additional 0.43 part of solids recovered from the aqueous phase by evaporation and extraction of the residue with acetone. The combined solids were leached with 100 parts of xylene, leaving a residue of 1.17 parts. This product which melted at 223–225° C. was para-cyanobenzamide. Its yield was 74.5 percent based on the reacted terephthalonitrile. 14 parts of unreacted nitrile were recovered from the xylene solution so that the conversion was 9.8 mol percent.

*Example 2*

15.42 parts of terephthalonitrile and 100.24 parts of water were treated as in Example 1, with the exception that the heating period was 16 hours. 14.72 parts of solids were recovered and an additional 0.9 part was obtained from the aqueous phase. The combined solids were extracted with 100 parts of acetone, leaving a residue of 0.52 part. This residue which had a nitrogen content of 17% was substantially pure terephthalamide, the yield being 6.4 mol percent based on the reacted nitrile. After evaporation of the acetone solution and leaching the residue with xylene, 6.1 parts of para-cyanobenzamide were obtained, corresponding to a yield of 83.5 mol percent based on the reacted nitrile. The xylene solution contained 9 parts of unreacted terephthalonitrile, giving a conversion of 41.5 mol percent.

*Example 3*

15.51 parts of terephthalonitrile and 100.37 parts of water were treated as in Example 1 for 25 hours. 15.22 parts of solids were recovered and combined with 1 part obtained from the aqueous phase. The combined solids were separated according to the method described in Example 2. 7.73 parts of para-cyanobenzamide, corresponding to a yield of 71 mol percent, and 2.51 parts of terephthalamide, corresponding to a yield of 20.5 mol percent, based on the reacted nitrile, were obtained in addition to 5.95 parts of unreacted terephthalonitrile. The conversion of terephthalonitrile was 61.6 mol percent.

*Example 4*

20.65 parts of terephthalonitrile and 120 parts of water were heated for 62 hours at 160° C. in a stainless steel shaking autoclave, the pressure being 75 p.s.i.g. After cooling the reaction mixture to room temperature, 17.38 parts of solids were filtered off and separated as described in Example 2. 16.98 parts of terephthalamide, 0.38 part of para-cyanobenzamide and 0.09 part of unreacted nitrile were recovered. The yield of terephthalamide was 64.8 mol percent and that of para-cyanobenzamide was 1.6 mol percent. The aqueous phase was decolorized with Nuchar C-190-N (a commercial form of activated charcoal) and then acidified to yield 6.25 parts of crude acids. Analysis showed that the acids contained 84% terephthalamic acid and 16% terephthalic acid. The yield of acids was 23.4 mol percent based on the nitrile reacted. The conversion of terephthalonitrile was 99.6 mol percent.

*Example 5*

15.49 parts of terephthalonitrile and 100.17 parts of water were heated for 14 hours at 180° C. in a stainless steel shaking autoclave, the pressure being 131 p.s.i.g. After cooling the reaction mixture to room temperature, 14.7 parts of solids were recovered and combined with 1.23 parts of solids recovered from the aqueous phase by evaporation and extraction of the residue with acetone. The combined solids were separated as in Example 1 to give 7.61 parts of para-cyanobenzamide, corresponding to a yield of 93 mol percent based on the reacted nitrile. 8.32 parts of unreacted terephthalonitrile were recovered, making the conversion 45.7 mol percent.

*Example 6*

10.25 parts of terephthalonitrile, 1.42 parts of crude acids comprising 73.8% terephthalic acid and 26.2% terephthalamic acid and 120 parts of water were heated for 15 hours at 225° C. in a stainless steel shaking autoclave, the pressure being about 356 p.s.i.g. On working up the reaction product as described in Example 4, 12.22 parts of crude acids were obtained. Upon analysis, these acids were found to correspond to a composition of 83.3% terephthalic acid and 16.7% terephthalamic acid. The yield of crude acids was 93.2 mol percent based on the nitrile charged.

*Example 7*

21.56 parts of a mixture containing 78% isophthalonitrile and 22% terephthalonitrile and 120 parts of water were heated for 17 hours at 200° C. in a stainless steel shaking autoclave, the pressure being 211 p.s.i.g. On working up the reaction product as described in Example 4, 25.1 parts of crude acids were obtained. Analysis showed these acids corresponded to a composition of 83% terephthalic and isophthalic acids and 17% teephthalamic and isophthalamic acids. The yield of crude acids was 89.6 mol percent based on the nitriles charged. 0.04 part of unreacted nitriles was recovered, indicating a conversion of 99.8 mol percent.

*Example 8*

20.89 parts of terephthalamide and 120 parts of water were heated for 15 hours at 250° C. in a stainless steel shaking autoclave, the pressure being 560 p.s.i.g. After cooling the reaction mixture to room temperature, 3.68 parts of solids were filtered off and discarded. On working up the aqueous phase as described in Example 4, 16.45 parts of a crude acidic product were obtained which was combined with an additional 0.47 part of material recovered from the acidified aqueous solution by partial evaporation. The crude product was analyzed and found to comprise 80.6% terephthalic acid and 19.4% terephthalamic acid. The yield of the acids was 77.8 mol percent. 3.7 parts of unreacted terephthalamide were recovered, giving a conversion of 82.3 mol percent.

*Example 9*

19.45 parts of terephthalamide and 120 parts of water were heated for 16 hours at 260° C. in a stainless steel shaking autoclave, the pressure being 665 p.s.i.g. On working up the reaction product as in Example 4, 13.88 parts of crude acid were obtained. Upon analysis, it was found that the acid corresponded to a composition of 73.2% terephthalic acid and 26.8% terephthalamic acid. The yield of the crude acids was 70.6 mol percent. 0.16 part of unreacted terephthalamide was recovered, indicating a conversion of 99.2 mol percent.

11.12 parts of the above crude acids and 120 parts of water were heated for 18 hours at 224° C. in a stainless steel shaking autoclave, the pressure being about 347 p.s.i.g. After the reaction was completed, 8.93 parts of solid acids were filtered off and combined with 0.95 part of acids obtained from the aqueous phase by the process of Example 5. The combined acids upon analysis were found to be pure terephthalic acid. The yield of terephthalic acid was 89 mol percent based on the original terephthalamide charge.

While we have described the preferred embodiments for carrying out the processes of our invention, it will be apparent that many changes may be made without departing from the spirit of the invention.

We claim:

1. A non-catalytic process for the hydrolysis of charge material of the group consisting of (1) terephthalonitrile, terephthalamide, isophthalamide and mixtures thereof and (2) mixtures of terephthalonitrile and isophthalonitrile which comprises maintaining the charge material in contact with water and at temperature of about 140° C. to 280° C. and under pressure for at least about 3 hours.

2. A non-catalytic process for the production of phthalic acids which comprises maintaining charge material of the group consisting of (1) terephthalonitrile, terephthalamide, isophthalamide and mixtures thereof and (2) mixtures of terephthalonitrile and isophthalonitrile in contact with water and at temperature of 200° C. to 280° C. and under pressure of 211 to 916 p.s.i.g. for at least about 3 hours, acidifying the resulting hydrolysis products and separating the desired phthalic acids therefrom.

3. A non-catalytic process for the production of hydrolyzed derivatives of phthalic acids which comprises maintaining charge material of the group consisting of (1) terephthalonitrile, terephthalamide, isophthalamide and mixtures thereof and (2) mixtures of terephthalonitrile and isophthalonitrile, in contact with water and at temperature ranging from about 140° C. to below 200° C. and under pressure ranging from about 38 to below 211 p.s.i.g. for at least about 3 hours, and separating the desired hydrolyzed derivatives of phthalic acids from the resulting hydrolysis products.

4. A non-catalytic process for the production of terephthalic acid which comprises maintaining terephthalonitrile in contact with water at temperature of 200° C. to 280° C. and under pressure of 211 to 916 p.s.i.g. for at least about 3 hours, acidifying the resulting hydrolysis products and separating terephthalic acid therefrom.

5. A non-catalytic process for the production of terephthalic acid which comprises maintaining terephthalonitrile in contact with water at temperature of 240° C. to 260° C. and under pressure of 470 to 665 p.s.i.g. for at least about 10 hours, acidifying the resulting hydrolysis products and separating terephthalic acid therefrom.

References Cited in the file of this patent

UNITED STATES PATENTS

| | | |
|---|---|---|
| 2,912,437 | Schutt | Nov. 10, 1959 |
| 2,979,526 | Gasson et al. | Apr. 11, 1961 |